Oct. 23, 1951 V. J. TERRY ET AL 2,572,074

VOICE FREQUENCY SIGNALING SYSTEM

Filed July 7, 1948 3 Sheets-Sheet 1

Inventors
Victor John Terry
Thomas Frederick Stanley Hargreaves
William Frederick Gould
By R. P. Morris
Attorney Oct. 23, 1951 V. J. TERRY ET AL 2,572,074

VOICE FREQUENCY SIGNALING SYSTEM

Filed July 7, 1948 3 Sheets-Sheet 2

Victor John Terry
Thomas Frederick Stanley Hargreaves
William Frederick Gould
Inventors
By R P Morris
Attorney Oct. 23, 1951 V. J. TERRY ET AL 2,572,074

VOICE FREQUENCY SIGNALING SYSTEM

Filed July 7, 1948 3 Sheets-Sheet 3

Inventors
VICTOR JOHN TERRY
THOMAS FREDERICK STANLEY HARGREAVES
WILLIAM FREDERICK GOULD By R. P. Morris Attorney Patented Oct. 23, 1951

2,572,074

UNITED STATES PATENT OFFICE 2,572,074

VOICE-FREQUENCY SIGNALING SYSTEM

Victor John Terry, Thomas Frederick Stanley Hargreaves, and William Frederick Gould, London, England, assignors to International Standard Electric Corporation, New York, N. Y., a corporation of Delaware Application July 7, 1948, Serial No. 37,436
In Great Britain July 9, 1947

11 Claims. (Cl. 177—353)

Figure 1:
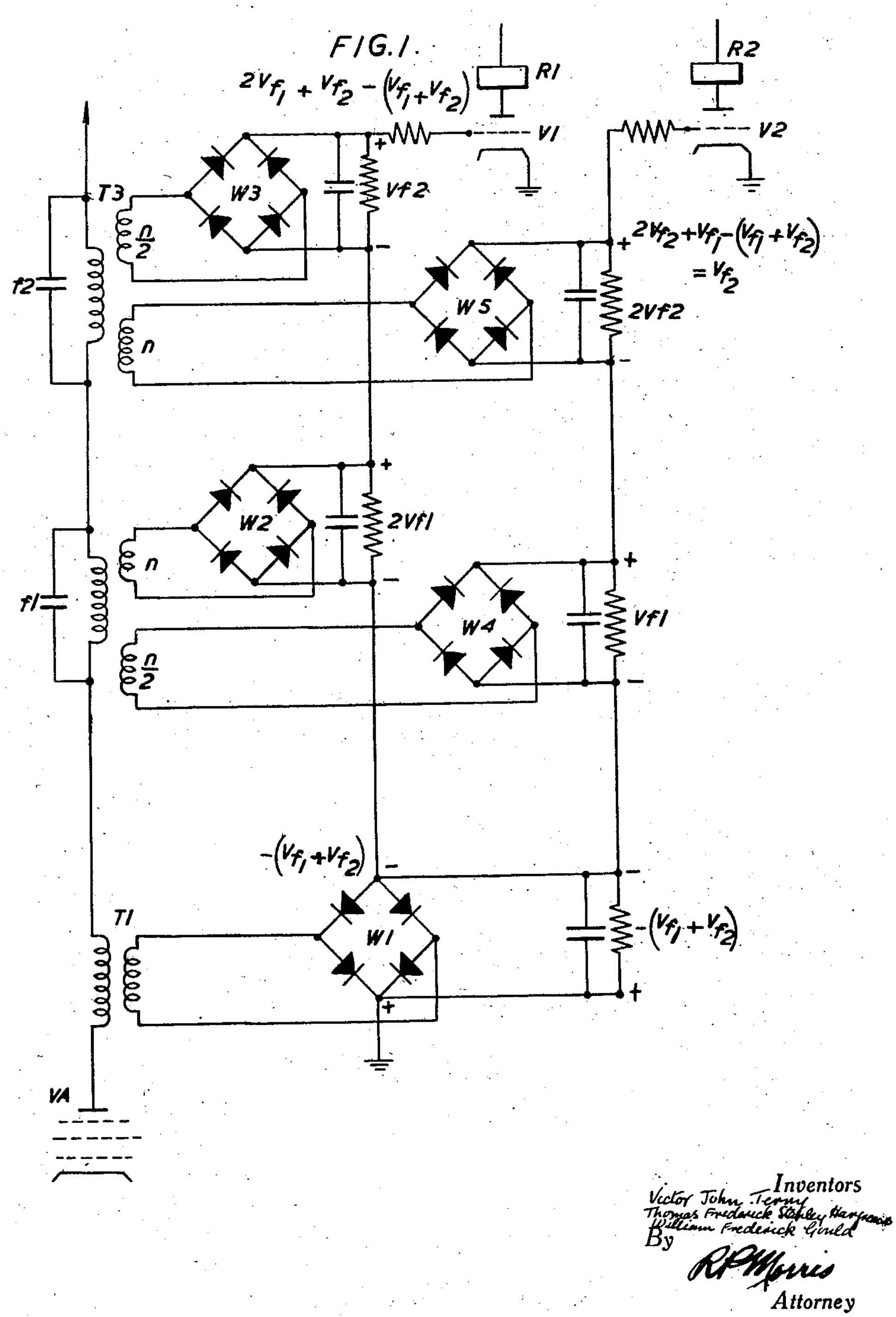

This invention relates to voice-frequency signalling receivers for two or more frequencies.

In a signalling system of the type using signalling frequencies in the speech band it is usual to provide guard circuits which block the operation of the receiver if frequencies other than the signalling frequency or frequencies are present. With a single signalling frequency a simple arrangement is obtained by having a guard circuit and a signalling circuit in opposition, applying currents of all frequencies to the guard circuit and current of the signalling frequency only to the signalling circuit. Only simple filtering is then necessary and the relative sensitivities of the signalling and guard circuits can be readily adjusted. Such an arrangement has the advantage of simplicity and reproducibility and it is readily possible to specify the guard sensitivities of receivers of different detailed design. A normal adjustment is for the guard circuit to be about one-half as sensitive as the signal circuit is to a sinusoidal input of the mean signal frequency. Under these conditions a guard frequency will produce say V volts in the guard circuit and little or nothing in the signal circuits. An equal signal current produces 2V volts in the signal circuit opposed by V volts in the guard circuit giving a net result of V volts to operate the output stage of the receiver. When 2 or more signalling frequencies are used together the problem becomes more difficult. With a receiver designed as above the operation would be correct when only one signalling frequency at a time was applied but when two or more signalling frequencies were applied the guard circuit would produce too much opposing voltage. When the guard current is rectified the rectified guard voltage when two frequencies are applied simultaneously depends on the type of smoothing used after the rectifier, and in general the guard voltage would be between V and 2V volts instead of the V volts desired.

The operating margins would be severely cut down and in the extreme case the receiver would not operate at all. In the past this problem has been solved either by reducing the amount of guarding with consequent loss of speech immunity, or by added filter circuits to make the guard circuit response fall at the signalling frequencies.

The object of the present invention is to avoid this additional filtering and still retain the full performance and operating margins of the single frequency receiver.

In Belgian Patent No. 482,596 there is described arrangements for a 2-frequency receiver provided with a tuned guard circuit which provides counter bias in common to the two signalling frequency outputs, and so arranged as to be in parallel at a certain voltage level with an individual counter-bias circuit derived from each of the signalling frequencies separately. By this means the two signalling circuits can be made substantially independent in operation.

In the present invention the desired result is obtained by the addition of compensating circuits interacting with the main circuits, and an untuned, or flat, guard circuit in common to both circuits.

According to the invention we provide a voice frequency receiver comprising signal responsive circuits for two or more frequencies and an aperiodic guard circuit, and in which means are provided in the form of compensating outputs derived from the signal responsive circuits to offset the rise in guard circuit voltage when more than one pure signalling frequency is being received.

Further according to the invention we provide a voice frequency receiver adapted to respond to pure signals of two or more frequencies and to fail to respond to signals of impure frequency, which comprises a signal responsive circuit for each said frequency and rectifying means associated therewith to produce a main D. C. output and compensating D. C. output or outputs in the same phase; which further comprises an aperiodic guard circuit adapted to respond to all frequencies in the range of frequencies to which the said receiver is likely to be subjected in use, and rectifying means associated with the said guard circuit to produce a D. C. output which for a single pure signal frequency is substantially equal in amplitude to any one of the said compensating outputs, but opposed in sign thereto, but for any other condition is of greater amplitude than any one of said compensating outputs; means for combining each said main output with the guard output and with each (including one) of the compensating outputs of the other signal responsive circuits; and a signal responsive device associated with each said signal responsive circuit and adapted to respond to the output from the corresponding combining means.

By means of this arrangement it will be seen that the current available for operating any one signal responsive device will be reasonably unchanged however many or few of the signal frequencies are received, provided of course that the frequency appropriate to that signal device is present and that the frequencies received are otherwise pure signal frequencies. If impure frequencies are received then there is no particular relationship between guard circuit output and signal circuit output, and the guard output will, in general, predominate over any outputs from the signal circuits, and so prevent the responsive devices operating.

The invention will be particularly described with reference to the accompanying drawing.

Figure 2:
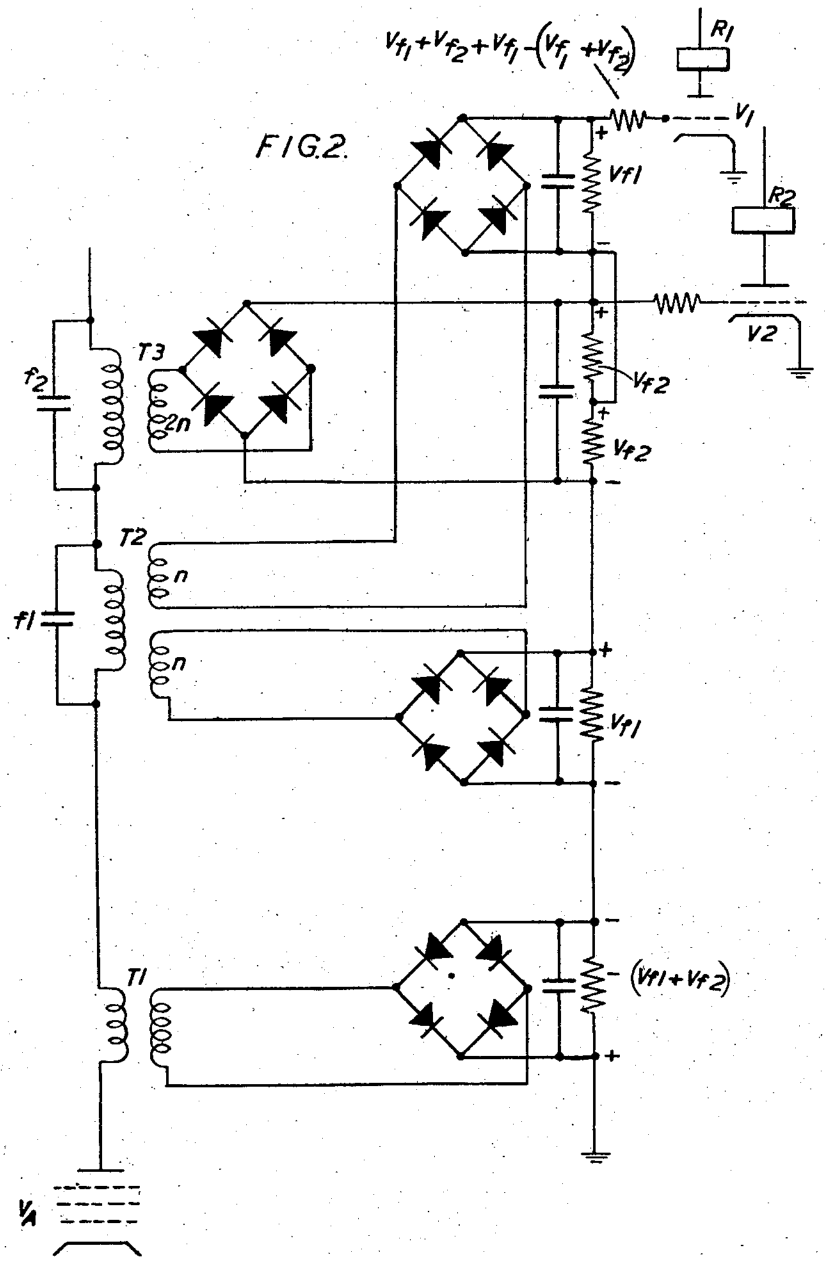
Figure 3:
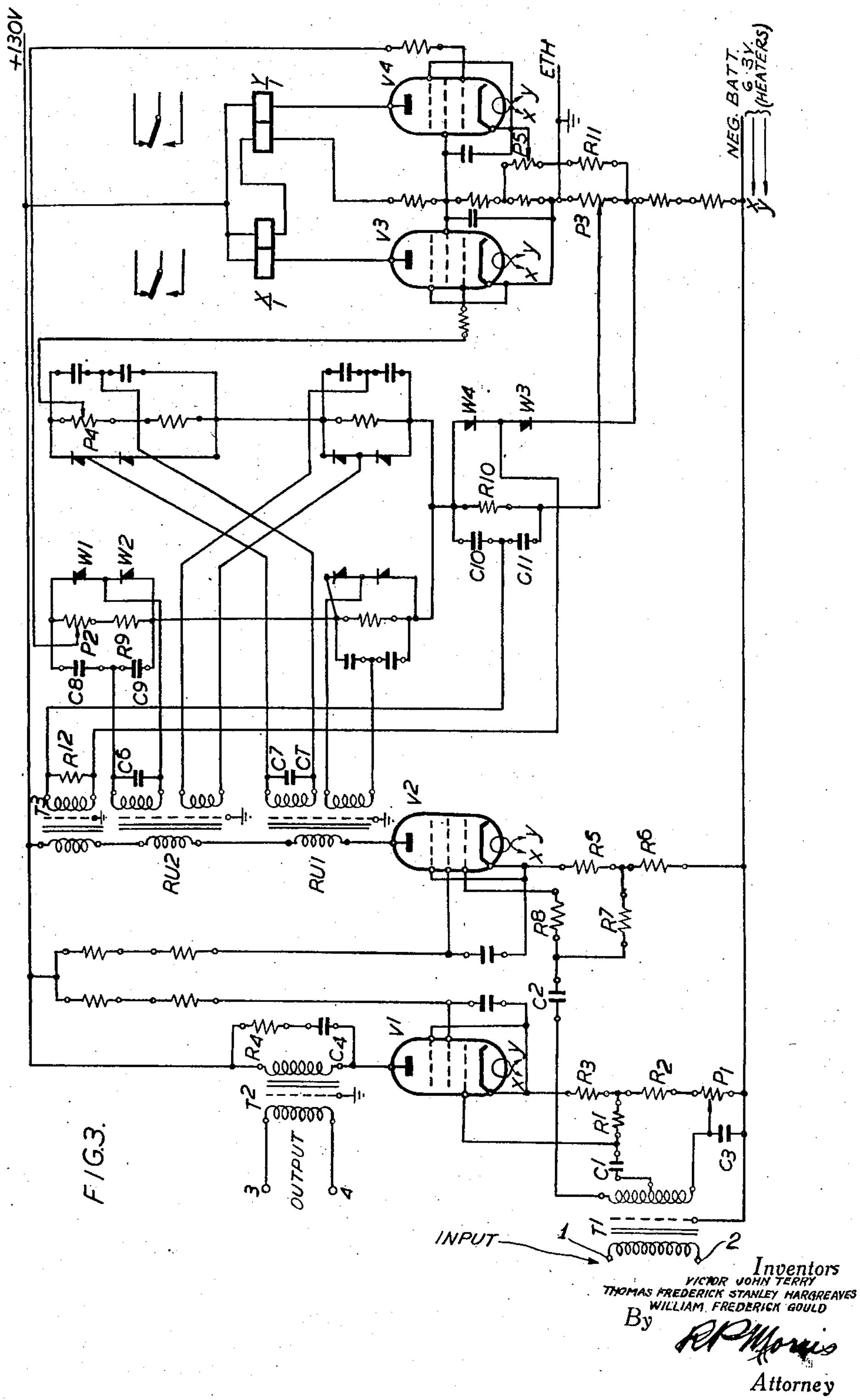

In the drawings, Figs. 1 and 2 illustrate in principle two ways of carrying out the invention, while Fig. 3 illustrates a preferred embodiment in some detail.

Referring to Fig. 1, this figure shows an embodiment of the invention as applied to a two-frequency receiver.

VA is a preliminary amplifier whose output feeds three transformers T1, T2, T3, connected in series. The output of T1 is rectified by bridge rectifier W1 to produce a negative voltage in the grid circuits of the output valves V1 and V2, and is designed to have a flat characteristic over the whole band of speech frequencies, the circuit of T1 being aperiodic.

T2 and T3 are tuned respectively to the two signalling frequencies $f1$ and $f2$ and each has two outputs one twice the magnitude of the other as represented by the turns in the respective secondary windings, viz. $n$ and $n/2$. The larger of the two, namely $n$, will be called the main output and the smaller, $n/2$ will be called the compensating output; all four outputs are rectified in bridge rectifiers W2—W5. The main output of T2 and compensating output of T3 are connected additively in series, each producing a positive output in the grid circuit of V1, and the main output of T3 and compensating output of T2 are similarly connected in the grid circuit of V2. The output of T1 is connected in series opposition with each of the T2—T3 circuits. V1 and V2 each operate a receive relay (R1 or R2) in their anode circuits.

The proportions are such that the response of T1 is equal (and opposite) to the compensating output of T2 to frequency $f1$ or of T3 to frequency $f2$. Thus when frequency $f1$ is applied there is an output from the guard circuit of —V volts, an output from T2 main of +2V volts and from T2 compensating of +V volts. Thus the potential applied to valve V1 is $T2$ main$-T1=2V-V=V$ volts and that applied to valve V2 is $T2$ compensating $-T1=V-V=0$ volts.

Now when $f1$ and $f2$ are applied simultaneously the outputs are

T2 main, 2 $Vf1$
T2 compensating, $Vf1$
T3 main, 2 $Vf2$
T3 compensating, $Vf2$
T1$-(Vf1+Vf2)$ Thus the voltage applied to V1 grid $$=2\ Vf1+Vf2-(Vf1+Vf2)=Vf1$$

and the voltage applied to V2 grid $$=2\ Vf2+Vf1-(Vf1+Vf2)=Vf2$$

i. e. the output valves are worked under the same conditions as when only one frequency is applied.

Thus each signal circuit provides a compensating bias for the other signal circuit which neutralises the increase in guard circuit output when the two signalling frequencies are present.

Fig. 2 shows a modification of this arrangement which is similar to the above but involves fewer elements. In this case T2 has two outputs which may be taken as equal and T3 has one output of double the value of either, the rectified side of which is centre-tapped in its load resistance. Both the T2 outputs and half the T3 output are connected additively in the grid circuit of V1 and one of the T2 outputs and the whole T3 output are additively connected in the grid circuit of V2. As before the T1 output is common to both grid circuits, and exerts an opposing influence, and the results generally, in terms of grid voltage applied to V1 or V2 are similar.

Fig. 3 shows a more complete schematic based on the arrangements of Fig. 1, and particularly adapted for insertion in the receive path of a 4 wire communication circuit, as described in South African Patent No. 5,122.

The V. F. input from the line, at terminals 1 and 2 is connected via a transformer T5 to two valve amplifiers V3 and V4, the former of which provides the speech output, via transformer T6 and terminals 3 and 4, to the 4 wire/2 wire network, while the latter acts as the input valve to the V. F. receiver proper. V3 thus acts as the buffer amplifier described in the above mentioned South African patent for preventing signal-interference from backwardly received speech. This valve is given approximately 20 db of negative feed-back in its cathode circuit by resistors R2 and R3, and potentiometer P1 to ensure stable operation, gain variation through the stage being provided by variation of this feed-back over a range of approximately ±3 db by the potentiometer P1.R3 provides the normal grid bias for the valve applied through R1, C1 is a feed and blocking condenser, C3 a decoupling condenser.

The input and output transformers T5 and T6 of the buffer amplifier valve V3 are arranged so that their frequency responses are compensatory, thus providing a flat response over the required voice range, e. g. 300–3600 C. P. S. The R4—C4 network in shunt with T6 primary winding assist in this compensation. The outputs from the secondary of T5 are shown separated, the larger being taken to V4 (via C2 and R8) but this arrangement is not essential of course, and is dictated merely by design considerations. R5 provides grid bias for V4, fed thereto via R7 and with R6 provides negative feedback.

In the anode circuit of V4 are two tuned circuits RU1 and RU2 which act as signal detecting circuits, being tuned respectively to the appropriate signalling frequencies by the tuning condensers C6 and C7 shown on one secondary of each, and a transformer T4 which is untuned and provides the aperiodic guard circuit previously referred to. The signal circuits are used to drive two D. C. amplifier valves V5 and V6 in the anodes of which are polarised signalling relays X and Y.

V5 and V6 are normally biassed back beyond cut-off by negative voltages developed across P3, and P5+R11 respectively in the potentiometer chain of resistors (including the biassing winding of relays X and Y) which stretch between the +130 volt and NEG bus-bars. These voltages are fed to the respective control grids of the valves via rectifiers W6 and W7 forming part of a voltage doubler rectifier circuit

W6—W7—C10—C11 fed from the guard outputs, and then separately via the voltage doubler circuits associated with the outputs of the signal circuits.

Each signal circuit provides two outputs, a main output (upper winding) and a compensating ouput (lower winding) and these are rectified separately in voltage doubler circuits like W8—W9—C8—C9 connected to RU2 upper secondary winding to provide a D. C. bias across the associated load resistor (R9—P2 in this case).

As stated in the description of Fig. 1, the main output from one tuned circuit and the compensating output from the other are connected additively in series to provide a positive counter-bias to the grid of the associated valve, the guard circuit output voltage developed across R10, subtracting from both counter-bias voltages.

The resistance R12 connected across the guard circuit transformer T4 is designed to provide the major portion of the load to the transformer so that the doubler, in effect, works from a low impedance source. As a result of this, the guard circuit doubler has a quick build-up and slow decay characteristic which ensures good impulsing with varying input levels to valve V4.

Potentiometer P3 in the common cathode circuit to V5—V6 provides for general adjustment of the standing bias applied to both valves together while P5, in the individual cathode circuit of V6, enables the bias on this valve to be varied differentially.

The potentiometers P2 and P4 in the load circuits of the voltage doublers of the main signal circuit outputs enable the ratio of the main outputs to the guard outputs to be varied from the usual 2:1 ratio provided, and these potentiometers are set to provide good impulsing at high input level. Variation of P3 and P5, on the other hand, enable good impulsing to be obtained at low signal levels, for which purpose the operation of valves V5 and V6 about the correct grid bias points is essential.

The D. C. relays provided are most suitable as the signal responsive devices, as being voltage operated, they make the least demands on the signal responsive circuits. However, power operated devices such as sensitive relays may be adapted for direct operation from the combined outputs of the voltage doublers, particularly if only two or three frequencies are to be provided for.

This description has been written in terms of a guard circuit having half the output of the main signal circuit as this is a ratio commonly adopted. However, the invention is not limited to this condition and is equally applicable to other guard ratios which may be desired. The invention lies in the use of compensating potentials to compensate for the undesired increase of guard response when more than one signal frequency is required at a time.

The invention also is not limited in its application to two signalling frequencies only, and may be readily adapted for more than two. In such a case the compensating output from each signal circuit must be available for all the other signal circuits provided, since each signal frequency will produce an effect in the common guard circuit and must be compensated for, as explained at the beginning of this description.

We claim:

1. In a signalling system wherein first signals are transmitted over a band of frequencies and second and third signals are transmitted at substantially single frequencies within said band, a receiver comprising a first circuit responsive to said second signal, a second circuit responsive to said third signal and means for preventing response of said first and second circuits to said first signals and permitting response when both said second and third signals are received simultaneously comprising means for selecting said second signal, means for selecting said third signal, guard means for receiving all said signals, means connecting both of said selecting means to each of said receiving circuits with their outputs combined additively and means connecting the output of said guard means in series-opposition to each of said combined outputs of said selecting means.

2. In a signalling system wherein first signals are transmitted over a band of frequencies and second and third signals are transmitted at substantially single frequencies within said band, a receiver comprising a first circuit responsive to said second signal, a second circuit responsive to said third signals and means for preventing response of said first and second circuits to said first signals and permitting response when both said second and third signals are received simultaneously comprising means for selecting said second signal, means for selecting said third signal, guard means for receiving all said signals, means for connecting said selecting means in series with their outputs in phase and for connecting said series connected selecting means to said first and second circuits and means for connecting said guard means in series with said series connected selecting means and with its output in phase opposition to the outputs of said selecting means.

3. A receiver comprising means for receiving signals having frequencies within a predetermined band, first means connected to said receiving means for selecting a signal of a first frequency in said band, second means connected to said receiving means for selecting a signal of a second frequency in said band, first and second translating means each comprising input and output circuits and means for preventing transfer of energy from said input circuit to said output circuit, means connected between said first means and said first and second translating means for coupling a predetermined amount of energy output of said first means to the input circuit of said first translating means and a lesser amount to the input circuit of said second translating means, means connected between said second means and said first and second translating means for coupling a predetermined amount of the energy output of said second means greater than said lesser amount to the input circuit of said second translating means and for coupling an amount of energy less than said first-mentioned predetermined amount to the input circuit of said first means and means for coupling signals within said band to said preventing means whereby signals of said first frequency and said second frequency produce energy changes in the output circuits of said first and second translating means respectively but signals having several frequencies prevent said energy changes.

4. In a signalling system wherein a first signal predominantly of a predetermined audio frequency is impressed upon a line at predetermined times, wherein a second signal predominantly of a different audio frequency is impressed upon said line at said times, and wherein a complex signal including said two audio frequencies and other audio frequencies is impressed upon said line at other times, two responding devices connected to said line, a first rejector resonant circuit connected to one of said devices for preventing that device from responding to said first signal, a second rejector resonant circuit connected to the other one of said devices for preventing said other device from responding to said second signal, means for connecting the first rejector resonant circuit to the other of said devices and the second rejector resonant circuit to said one of said devices, and a guard circuit responsive to said complex signal effective to prevent either of said devices from responding to said complex signal.

5. In a signalling system wherein a first signal predominantly of a predetermined audio frequency is impressed upon a line at predetermined times, wherein a second signal predominantly of a different audio frequency is impressed upon said line at said times, and wherein a complex signal including said two audio frequencies and other audio frequencies is impressed upon said line at other times, two responding devices connected to said line, a first rejector resonant circuit connected to one of said devices for preventing that device from responding to said first signal, a second rejector resonant circuit connected to the other one of said devices for preventing said other device from responding to said second signal, means for connecting the first rejector resonant circuit to the other of said devices and the second rejector resonant circuit to said one of said devices, and a guard circuit responsive to said complex signal effective only to prevent either of said devices from responding to said other audio frequencies.

6. A receiver for receiving a plurality of signals in a predetermined frequency range comprising a first frequency selective circuit having high and low level outputs, a second frequency selective circuit having an output, a third circuit responsive to all signals in said frequency range, a pair of amplifiers having input circuits, means for connecting the high level output of said first circuit and output of said second circuit in phase aiding and the third circuit in phase opposition to the input circuit of one of said amplifiers, and means for similarly connecting the low level output of said first circuit, the output of said second circuit and the third circuit to the input circuit of the other of said amplifiers.

7. A receiver for receiving a plurality of signals in a predetermined frequency range comprising a first frequency selective circuit having high and low level outputs, a second frequency selective circuit having high and low level outputs, a third circuit responsive to all signals in said frequency range, a pair of amplifiers having input circuits, means for connecting the high level output of said first circuit and the low level output of said second circuit in phase aiding and the third circuit in phase opposition to the input circuit of one of said amplifiers, and means for similarly connecting the low level output of said first circuit, the high level output of said second circuit and the third circuit to the input circuit of the other of said amplifiers.

8. A receiver for receiving a plurality of signals in a predetermined frequency range comprising means for developing a first biassing voltage comprising means for selecting signals of a first frequency within said range and means connected to said selecting means for rectifying and filtering said first frequency signals, means for developing a second biassing voltage comprising means for selecting signals of a second frequency within said range and means connected to said last-mentioned selecting means for rectifying and filtering said second frequency signals, means for developing a third biassing voltage comprising means for rectifying and filtering said first and second frequency signals and other signals in said range, a first amplifier, means for connecting said first bias developing means and a portion of said second bias developing means to said amplifier in a first sense and for connecting said third bias developing means to said amplifier in an opposing sense, a second amplifier, and means for connecting said second bias developing means and a portion of said first bias developing means to said second amplifier in a first sense and for connecting said third bias developing means to said amplifier in an opposing sense.

9. A receiver for receiving a plurality of signals in a predetermined frequency range comprising means for developing a first biassing voltage comprising the means for selecting signals of a first frequency within said range and means connected to said selecting means for rectifying and filtering said first frequency signals, means for developing a second biassing voltage comprising means for selecting signals of a second frequency within said range and means connected to said last-mentioned selecting means for rectifying and filtering said second frequency signals, means for developing a third biassing voltage comprising means for rectifying and filtering said first and second frequency signals and other signals in said range, a first amplifier comprising a vacuum tube having control electrodes, means for connecting the positive end of said first bias developing means and a positive portion of said second bias developing means to a control electrode of said tube and for connecting the negative end of said third bias developing means to a control electrode of said tube, a second amplifier comprising a vacuum tube having control electrodes, means for connecting the positive end of said second bias developing means and a positive portion of said first bias developing means to a control electrode of said tube in said second amplifier and for connecting the negative end of said third bias developing means to a control electrode in the said tube of said second amplifier.

10. A receiver according to claim 9 wherein the voltage at the positive end of said first biassed developing means is substantially twice the voltage at the point of positive connection on said portion of said second biassed developing means and the positive voltage developed at the positive end of said second biassed developing means is substantially twice the voltage developed at the positive point of connection at said portion of said first biassed developing means.

11. A receiver according to claim 9 wherein each of said vacuum tubes further comprises an output electrode and said receiver further comprises a relay connected to said output electrode and responsive to electron current in said tube.

VICTOR JOHN TERRY.
THOMAS FREDERICK STANLEY HARGREAVES.
WILLIAM FREDERICK GOULD.

REFERENCES CITED

The following references are of record in the file of this patent:

UNITED STATES PATENTS

| Number | Name | Date |
|---|---|---|
| 2,255,190 | Tyall | Sept. 9, 1941 |
| 2,282,131 | Hadfield | May 5, 1942 |
| 2,282,271 | Terroni | May 5, 1942 |